United States Patent
Streshinsky et al.

(10) Patent No.: US 10,401,655 B2
(45) Date of Patent: Sep. 3, 2019

(54) BIAS CONTROL OF OPTICAL MODULATORS

(71) Applicant: Elenion Technologies, LLC, New York, NY (US)

(72) Inventors: Matthew Akio Streshinsky, New York, NY (US); Ari Novack, New York, NY (US); Kishore Padmaraju, New York, NY (US); Michael J. Hochberg, New York, NY (US); Alexander Rylyakov, Staten Island, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 15/381,388

(22) Filed: Dec. 16, 2016

(65) Prior Publication Data

US 2018/0173023 A1 Jun. 21, 2018

(51) Int. Cl.
| | | |
|---|---|---|
| G02F 1/01 | (2006.01) | |
| G02F 1/21 | (2006.01) | |
| G02F 1/225 | (2006.01) | |
| H04B 10/50 | (2013.01) | |

(52) U.S. Cl.
CPC ............ G02F 1/011 (2013.01); G02F 1/0123 (2013.01); G02F 1/2255 (2013.01); *G02F 2001/212* (2013.01); *G02F 2201/58* (2013.01); *G02F 2203/20* (2013.01); *H04B 10/5053* (2013.01); *H04B 10/50575* (2013.01)

(58) Field of Classification Search
CPC ........................... G02F 1/0123; G02F 2001/58
USPC ...................... 385/1–3, 9, 14–16, 21, 22, 42
See application file for complete search history.

(56) References Cited

U.S. PATENT DOCUMENTS

| | | | |
|---|---|---|---|
| 6,091,535 A * | 7/2000 | Satoh | G02F 1/0123 |
| | | | 359/239 |
| 6,917,455 B2 | 7/2005 | McBrien et al. | |
| 7,116,460 B2 | 10/2006 | Griffin | |
| 7,327,911 B2 * | 2/2008 | Piede | G02F 1/025 |
| | | | 385/129 |
| 7,394,992 B2 | 7/2008 | Kimmitt et al. | |
| 8,041,228 B2 * | 10/2011 | Charlet | G02F 1/0123 |
| | | | 398/158 |
| 8,050,351 B2 * | 11/2011 | Cho | G02F 1/225 |
| | | | 332/103 |
| 8,050,555 B2 * | 11/2011 | McBrien | H04B 10/505 |
| | | | 398/16 |

(Continued)

FOREIGN PATENT DOCUMENTS

JP  2011-55330  *  3/2011  ............ H04B 10/04

OTHER PUBLICATIONS

"Ultra-high-capacity DWDM transmission system for 100G and beyond" by Yu et al, IEEE Communications Magazine, pp. 556-564, 2010.*

(Continued)

*Primary Examiner* — Robert Tavlykaev
(74) *Attorney, Agent, or Firm* — Stratford Managers Corporation

(57) ABSTRACT

An optical waveguide modulator with automatic bias control is disclosed. A portion of the modulator light is mixed with reference light and converted to one or more electrical feedback signals. An electrical feedback circuit controls the modulator bias responsive to the feedback signals.

18 Claims, 17 Drawing Sheets

(56) References Cited

U.S. PATENT DOCUMENTS

| | | | | |
|---|---|---|---|---|
| 8,184,355 B2* | 5/2012 | Tsunoda | | G02F 1/0123 |
| | | | | 359/237 |
| 8,762,086 B2* | 6/2014 | Tao | | H04L 27/3872 |
| | | | | 702/66 |
| 9,116,368 B2 | 8/2015 | Kawakami et al. | | |
| 9,350,455 B2* | 5/2016 | Akiyama | | G02F 1/0123 |
| 10,191,306 B2* | 1/2019 | Griffin | | G02F 1/0123 |
| 2007/0292142 A1* | 12/2007 | Hashimoto | | H04B 10/25758 |
| | | | | 398/186 |
| 2009/0296192 A1* | 12/2009 | Morishita | | G02F 1/0123 |
| | | | | 359/288 |
| 2011/0090992 A1* | 4/2011 | Chung | | H04L 27/0014 |
| | | | | 375/340 |
| 2012/0093457 A1* | 4/2012 | Sakamaki | | H04B 10/60 |
| | | | | 385/14 |
| 2012/0288284 A1* | 11/2012 | Yoshida | | H04B 10/5053 |
| | | | | 398/186 |
| 2013/0051723 A1* | 2/2013 | Sudo | | G02F 1/0123 |
| | | | | 385/3 |
| 2014/0294337 A1* | 10/2014 | Heaton | | G02F 1/225 |
| | | | | 385/3 |
| 2015/0277207 A1* | 10/2015 | Fujikata | | G02F 1/225 |
| | | | | 385/3 |
| 2016/0054529 A1* | 2/2016 | Yashiki | | G02B 6/305 |
| | | | | 385/2 |
| 2018/0069624 A1* | 3/2018 | Takechi | | H04B 10/0795 |
| 2018/0074386 A1* | 3/2018 | Chung | | G02F 1/3136 |

OTHER PUBLICATIONS

H. Kawakami et al.; "Auto Bias Control Technique Based on Asymmetric Bias Dithering for Optical QPSK Modulation," IEEE J. Lightwave Technology, vol. 30 No. 7, Apr. 1, 2012; pp. 962-968 (7 pages).

Y. Yang, et al.; "A robust and dither-free technique for controlling driver signal amplitude for stable and arbitrary optical phase modulation," Optics Express, vol. 19, No. 27, Dec. 19, 2011; pp. 26353-26358 (6 pages).

P. S. Cho, et al.; "Closed-Loop Bias Control of Optical Quadrature Modulator," IEEE Photonics Technol. Ltrs, vol. 18, No. 21, Nov. 1, 2006; pp. 2209-2211 (3 pages).

\* cited by examiner

BIAS CONTROL OF OPTICAL MODULATORS

FIELD OF THE INVENTION

The invention generally relates to photonic integrated circuits, and more particularly relates to an apparatus and method for an automated bias monitoring and control of an optical quadrature modulator.

BACKGROUND OF THE INVENTION

Optical waveguide modulators used in high-speed optical communications, such as those based on waveguide Mach-Zehnder (MZ) interferometric structures, may require active control of their operating conditions, and in particular of their bias voltage that sets the relative phase of interfering light waves in the modulator in the absence of the modulation signal. The waveguides of the modulator are typically formed in an electro-optic material, for example a suitable semiconductor or LiNbOx, where optical properties of the waveguide may be controlled by applying a voltage. Such a waveguide modulator may be a part of an optical integrated circuit (PIC) implemented in an opto-electronic chip.

Very high speed optical systems may benefit from Quadrature Amplitude Modulation (QAM), which may be realized using a quadrature modulator (QM) that may be implemented using nested MZ interferometric structures. Such structures typically require controlling several bias voltages. For example, a QAM optical signal may be generated by splitting light from a suitable light source between two MZ modulators (MZM) driven by an in-phase (I) and a quadrature (Q) complements of an electrical QAM signal carrying data, and then combining the resulting I and Q modulated light signals in quadrature, i.e., with a 90°, or $\pi/2$ radians (rad), relative phase shift $\phi_{IQ}$. For example the two MZMs of such QM may each be modulated by a BPSK (binary phase shift keying) signal while being biased at their respective null transmission points for push-pull modulation. When their outputs are added together in quadrature, i.e. with the relative phase shift $\phi_{IQ}=\pi/2$, a QPSK signal (Quaternary phase shift keying) results. While the bias voltages of the two MZMz for the push-pull modulations may be controlled by monitoring the time-averaged optical power at the output of the modulator, the output averaged optical power is insensitive to the IQ phase shift $\phi_{IQ}$, so that a drift of the bias voltage $V_{IQ}$ away from a bias point needed to maintain the desired IQ phase shift may be more difficult to monitor and correct for. Known techniques for monitoring the IQ phase shift $\phi_{IQ}$ in the modulator typically require high-bandwidth processing of the control signal, which is difficult to implement in practice.

Furthermore, existing feedback schemes that are used to control a set point of an optical MZ modulator typically require tapping off a small portion of the modulator output power to analyze for bias drifts. The tapped-off portion of the output power, although relatively small, should still be large enough in the conventional bias control techniques so that relatively small bias drifts may still be detected, which may measurably reduce the useful optical power from the modulator.

Accordingly, it may be understood that there may be significant problems and shortcomings associated with current solutions and technologies for controlling a bias point of an optical waveguide modulator suitable for use in high-speed optical systems.

SUMMARY OF THE INVENTION

Accordingly, one aspect of the present disclosure relates to an optical modulator device comprising:
(a) an optical modulator circuit (OMC) configured to modulate signal light at a target data rate and to produce modulated light, the OMC comprising a bias electrode configured to receive an electrical bias signal for controlling a modulator set point, and an optical tap port configured to provide tapped light indicative of the modulator set point;
(b) an optical mixer (OM) comprising a first optical port optically connected to the optical tap port of the OMC for receiving the tapped light and a second optical port for receiving reference light, the optical mixer configured to mix the reference light with the tapped light and to produce one or more mixed light signals each combining the reference and tapped light; and
(c) a photodetector (PD) circuit comprising one or more photodetectors (PDs) and configured to convert the one or more mixed light signals into one or more electrical feedback signals responsive to changes in the modulator set point.

One aspect of the present disclosure provides an optical waveguide modulator system comprising an optical waveguide modulator comprising a) an optical modulator circuit (OMC) configured to modulate signal light at a target data rate and to produce modulated light, the OMC comprising a bias electrode configured to receive an electrical bias signal for controlling a modulator set point, and an optical tap port configured to provide tapped light indicative of the modulator set point, b) an optical mixer (OM) comprising a first optical port optically connected to the optical tap port of the OMC for receiving the tapped light and a second optical port for receiving reference light, the optical mixer configured to mix the reference light with the tapped light and to produce one or more mixed light signals each combining the reference and tapped light; and c) a photodetector (PD) circuit comprising one or more photodetectors (PDs) and configured to convert the one or more mixed light signals into one or more electrical feedback signals responsive to changes in the modulator set point, the optical waveguide modulator system further including an electrical feedback circuit (EFC) connecting the PD circuit with the bias electrode and configured to generate the electrical bias signal in dependence on the one or more electrical feedback signals.

An aspect of the present disclosure provides a method to operate an optical modulator circuit (OMC) comprising an input port for receiving signal light, an output port for transmitting modulated light, a bias control port for receiving an electrical bias signal controlling a modulator set point, and a tap port for providing tapped light indicative of the modulator set point, the method comprising: a) mixing the tapped light with reference light of a greater power in an optical mixer to obtain one or more mixed light signals wherein the tapped light is combined with the reference light; and, b) using a PD circuit comprising one or more PDs to convert the one or more mixed light signals into one or more electrical feedback signals comprising information about the modulator bias.

In accordance with an aspect of the present disclosure, the method further includes c) generating the electrical bias signal in dependence on the one or more electrical feedback signals so as to maintain the modulator bias at a desired set point.

In accordance with one aspect of the disclosure, the method may be applied to the OMC that comprises a quadrature modulator configured to combine two modulated optical signals in quadrature, the quadrature modulator comprising a first optical phase shifter electrically coupled to the bias control port for varying an optical phase shift between the two modulated optical signals for setting the modulator bias. Step (a) of the method may then comprise obtaining first and second mixed light signals wherein the tapped light is added to the reference light with a phase shift that differs by 180□ between the first and second mixed signals, and step b) comprises differentially detecting the first and second mixed light signals to obtain a first differential PD signal, and rectifying the first differential PD signal to obtain the first electrical feedback signal.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

Figure 1:
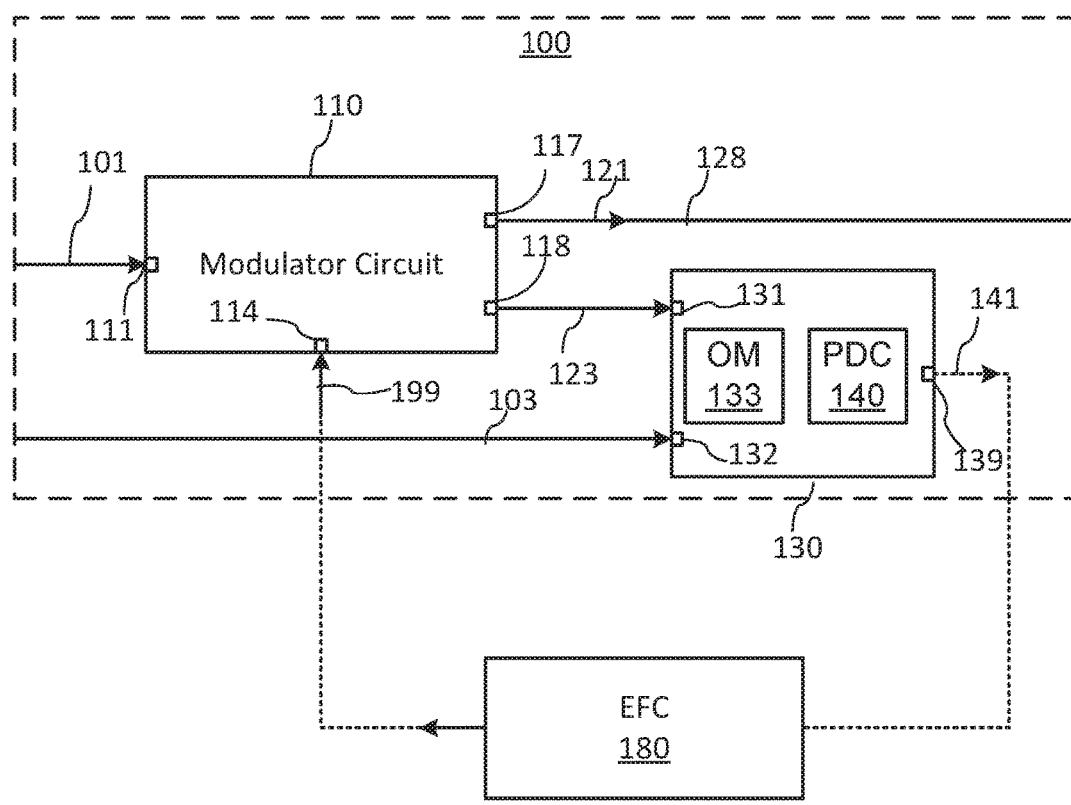
FIG. 1 is a schematic diagram of an optical waveguide modulator system having an optoelectronic feedback look for automatic control of the modulator bias incorporating an optical mixer for combining tapped-off modulator light with reference light.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
  CMOS Complementary Metal-Oxide-Semiconductor
  GaAs Gallium Arsenide
  InP Indium Phosphide
  $LiNO_3$ Lithium Niobate
  PIC Photonic Integrated Circuits
  SOI Silicon on Insulator
  PSK Phase Shift Keying
  BPSK Binary Phase Shift Keying
  QAM Quadrature Amplitude Modulation
  QPSK Quaternary Phase Shift Keying
  RF Radio Frequency Note that as used herein, the terms "first," "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by an optical device such as a polarizer or a waveguide, is to be understood as referring to an action performed by the optical device itself or by a component thereof rather than by an external agent.

The term "180° optical mixer" refers to an optical device that combines two input optical signals to produce two mixed optical signals wherein one of the two input optical signals is added to another of the two input optical signals with a phase offset of 180°, or π radian, therebetween. It will be appreciated that a 90° optical hybrid (OH) that is conventionally used in coherent optical detection schemes may be viewed as an example of a 180° optical mixer (OM) that produces two pairs of such counter-phase mixed optical signals with a 90° shift in the input signals phase offsets therebetween.

One aspect of the present disclosure relates to an optical waveguide modulator which must be suitably biased, or kept at a desired set point of its transfer characteristic, to have a desired modulation characteristic. The electrical signal that is required to maintain the desired modulator bias or set-point may be referred to herein as the bias electrical signal, and may be typically but not necessarily exclusively, in the form of dc bias voltage, which may be denoted Vb. In operation the modulator may experience changes in some of its properties, for example due to changes in its temperature or due to internal to modulator processes such as aging or impurity drift, which may cause the bias voltage that is required to maintain the desired set point to drift, resulting in a deterioration of one or more aspects of the modulator performance, and therefore necessitating a way to monitor that drift and to adjust the bias voltage accordingly. One way to accomplish that is to monitor the output optical signal from the modulator to detect the drift.

With reference to FIG. 1, there is schematically illustrated an example modulator device 100 which is configured to be operated in an automatic bias control scheme. It includes an optical modulator circuit (OMC) 110 which has an input optical port 111, an electrical bias control port 114, a main output optical port 117, and a tap optical port 118. The modulator device 100 further includes an optical mixing receiver (OMR) 130 that is optically coupled to the tap port 118 and is configured to provide, at its electrical port 139, one or more electrical feedback signals that are indicative of the modulator bias or the set point at which the modulator operates. An electrical feedback circuit (EFC) 180 may be connected between the electrical port of the OMR 130 and the bias control port 114 of the OMC 110 to close the bias control feedback path.

Figure 5:
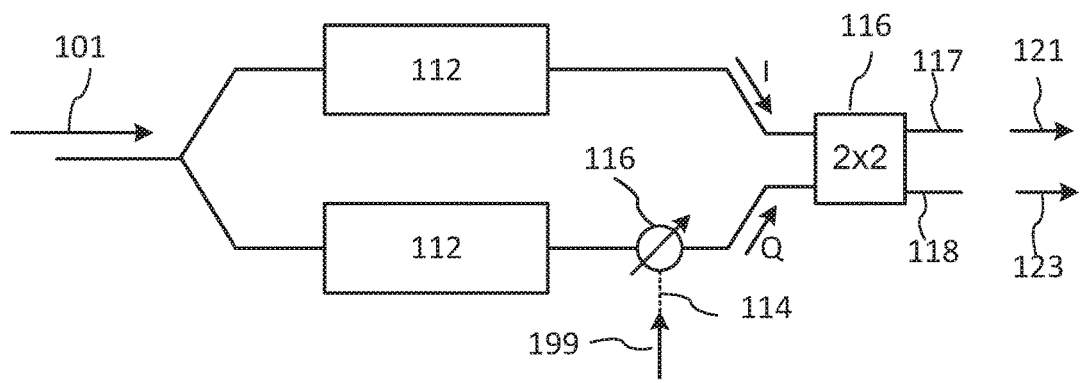
FIG. 5 is a schematic diagram of a waveguide quadrature modulator incorporating a tunable optical phase shifter for controlling a relative optical phase between in-phase (I) and quadrature (Q) optical signals.
Figure 6:
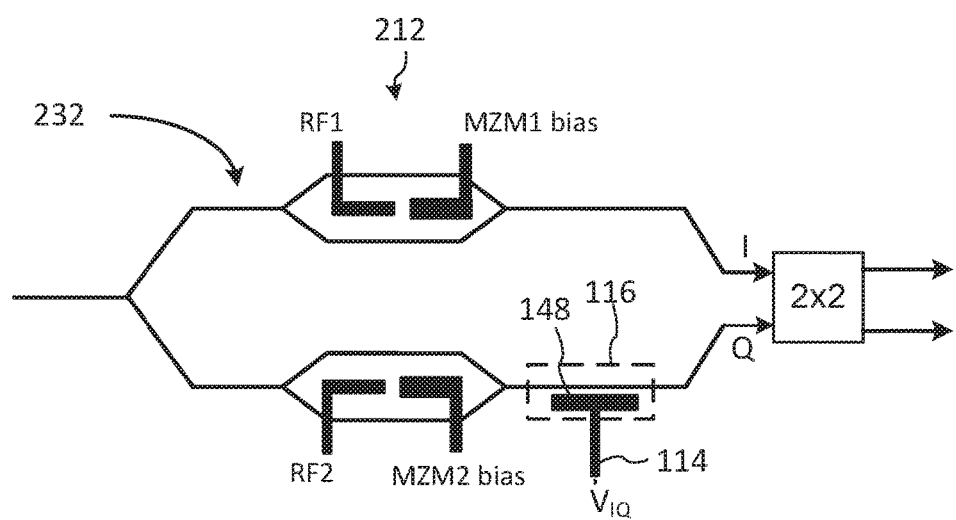
FIG. 6 is a schematic diagram of an embodiment of the waveguide quadrature modulator of FIG. 5 in the form of a nested Mach-Zehnder modulator.

The OMC 110 may conveniently be embodied using optical waveguides formed in or upon a support substrate of an electro-optic material, and may also be referred to herein as the optical waveguide modulator 110 or simply as the modulator 110. The OMC 110 is configured to modulate signal light 101 received by the OMC 110 at the input optical port 111 and to produce modulated light 121, which is transmitted from the main modulator output port 117. In some embodiments the modulated light 121 may carry useful data and be directed along a data path 128 of an optical communication system to an optical receiver at another end of an optical communication link. The bias control port 114 of the OMC 110 is configured to receive an electrical bias signal 143 for controlling the modulator set point. The output tap port 118 is configured to provide tapped light 123 indicative of the modulator set point. The tapped light 123 may be obtained, for example, by tapping off a small portion of the modulated light 121 at an output of the MOC 110. It may also be obtained by using an optical mixer at the output of the MOC 110 to produce both the modulated and tapped optical signals 121, 123. In some embodiments, the tapped light 123 may be tapped off at an intermediate location in the OMC 110.

in one embodiment the optical tap (not shown in FIG. 1) tapping off a portion of the modulated light 121 could be implemented on the same SOI wafer, or other suitable substrate, as the reset of the MOC 110, for example using a waveguide directional coupler, wherein two waveguides are brought close enough together such that some optical power may evanescently couple from the main input waveguide to the tap second waveguide. The optical tap could also be implemented using a 2×2MMI device with a large splitting ratio, such as for example 95:5, as schematically illustrated in FIGS. 5 and 6.

The OMR 130 has two optical ports, a first optical port 131 optically connected to the output tap port 118 of the OMC 110 for receiving the tapped light 123, and a second optical port 132 for receiving reference light 103, which may be also be referred to as the local oscillator (LO) light 103 or the amplifying light 103. The OMR 130 may include an optical mixer (OM) 133 configured to mix the reference light 103 with the tapped light 123 and to produce one or more mixed light signals each combining the reference and tapped light, and a photodetector (PD) circuit (PDC) 140 including one or more photodetectors (PDs) and configured to convert the one or more mixed light signals into one or more electrical feedback signals 141 responsive to changes in the modulator set point.

One advantage of mixing the tapped light 123 with the reference light 103 to obtain the electrical feedback signal or signals 141 is the ability to amplify the feedback signal when the optical power $P_r$ of the reference light 103 received by the OMR at the reference input port 132 is greater than the tapped optical power $P_s$, i.e., the optical power of the tapped light 123 received by the OMR 130 at the signal input port 131. The OMR 130 may be configured so that the electrical feedback signal or signals 141, denoted herein generally as S, become substantially proportional to the square root of the product $P_r \cdot P_s$, of the tapped optical power $P_s$ and the reference optical power $P_r$: $S \sim \sqrt{(P_r \cdot P_s)}$, or to the power product itself: $S \sim P_r \cdot P_s$, or generally to a rising function of the product: $S \sim F\{P_r \cdot P_s\}$, where $F\{x\}$ denotes a function of 'x' which value increases when 'x' increases.

Thus, by using a higher-power reference light 103, the electrical feedback signal or signals 141 at the output of the OMR 130 may be amplified relative to a direct detection scheme in the absence of a reference signal.

Figure 2A:
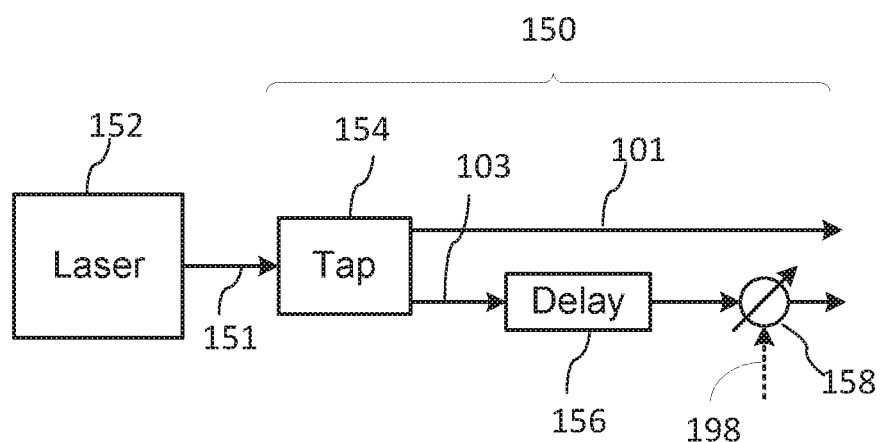
FIG. 2A is a schematic diagram of an input optical circuit for the optical waveguide modulator system of FIG. 1 wherein the modulator light and the reference light originate from a same optical source.
Figure 2B:
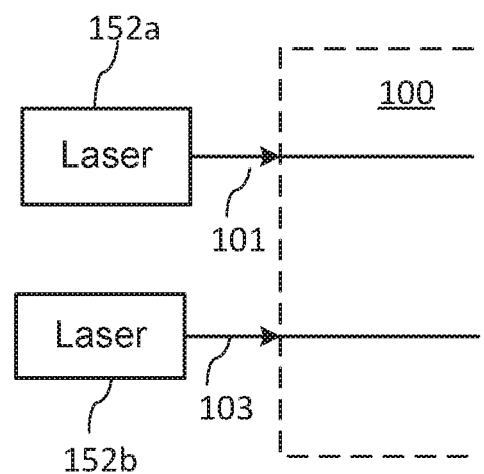
FIG. 2B is a schematic diagram of an input optical arrangement for an embodiment of the optical waveguide modulator system of FIG. 1 wherein the modulator light and the reference light originate from different optical sources.

With reference to FIGS. 2A and 2B, the signal light 101 and the reference light 103 may be produced by an optical source which may include one or more light emitters such as for example one or more laser diodes (LD) or/and one or more other suitable lasers or non-lasing light emitters, e.g., light emitting diodes (LEDs). In one embodiment, the modulator device 100 may include two optical ports, for example in the form of two planar optical waveguides, for receiving the signal light 101 and the reference light 103 separately from two different optical emitters, for example two different LDs or LEDs 152a and 152 as illustrated in FIG. 2B. In other embodiments the modulator device 100 may include an input optical port, such as for example a planar optical waveguide, for receiving input light from a single optical emitter, for example an LD or a LED, from which both the signal light 101 and the reference light 103 are produced. In one embodiment, the reference light 103 may be a delayed portion of the output signal light 121 or of the tapped light 123.

Figure 10:
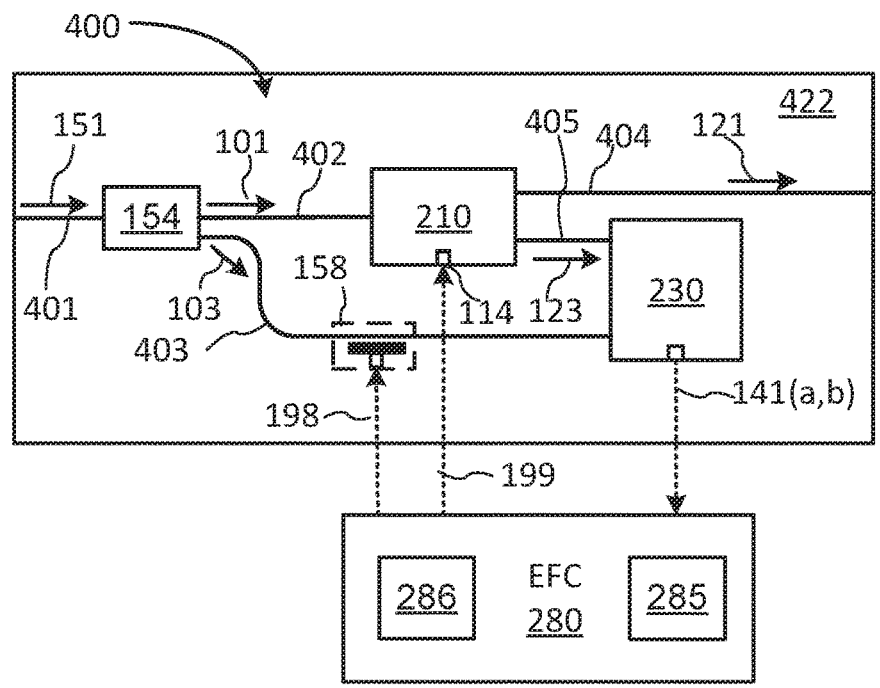
FIG. 10 is a schematic diagram of an embodiment of the modulator system of FIG. 1 including a quadrature modulator and an optoelectronic feedback for controlling an IQ bias of the quadrature modulator.

With reference to FIG. 2A, in one embodiment the modulator device 100 may include an input optical circuit 150 that is configured to produce the reference light 103 by tapping off a relatively small portion of input light 151 using an optical tap 154, with the rest of the input light 151 continuing towards the OMC 110 as the signal light 101. The input light 151 may be obtained for example from a laser source 152, such as a suitable LD. In some embodiments the input optical circuit 150 may further include an optical delay line 156 to approximately equalize the optical path length of the signal and reference light 101, 103 between the laser source 152 and the OMR 150, or to make the difference between the respective optical lengths to be less than the coherence length of the laser source 152. The delay line 156 may be absent in embodiments where the coherence length of the input light 151 is sufficiently large, or where the tapped light 123 and the reference light 103 are mixed in the OMR 130 incoherently. In some embodiments wherein the tapped light 123 and the reference light 103 are coherently mixed in the OMR 130, an optical phase tuner 158 may further be provided in the optical path of the reference light 103 in order to provide fine tuning of the optical phase $\phi_r$ of the reference light 103, as described more in detail hereinbelow. The optical phase tuner 158 may be embodied as known in the art, for example using one or more metal electrodes disposed over or adjacent to a waveguide formed in an electro-optic material, as illustrated in FIG. 10. It will be appreciated that the optical phase tuner 158 may also be embodied in other ways, for example using the thermo-optic effect by heating a resistive element within or near-to the core of the waveguide as known in the art.

Advantageously, in embodiments wherein the insertion loss of the OMC 110 is not insignificant, tapping off a small portion of the input light 151 prior to the OMC 110 and mixing it with the tapped light 123 provides the ability to substantially amplify the feedback signal S 141 at the cost of only a small decrease in the useful optical power at the output of the OMC 110, i.e., the optical power of the modulated signal 121. By way of example, in an embodiment wherein the electrical feedback signal S is proportional to the product $(P_r \cdot P_s)$ and the insertion loss of the OMC 110 is 10 dB, tapping off 3% of the input light 151 to produce the reference light 103 and 1% of the modulated light 121 to produce the tapped light 123 would result in almost 10 dB gain in the feedback signal compared to an equivalent non-mixing tapped light detection scheme with a 4% tap at the output of the OMC 110, for the same small increase in the total insertion loss of the modulator system from the output of the optical source 152 to the signal output port 117 of the OMC 110.

Figure 3:
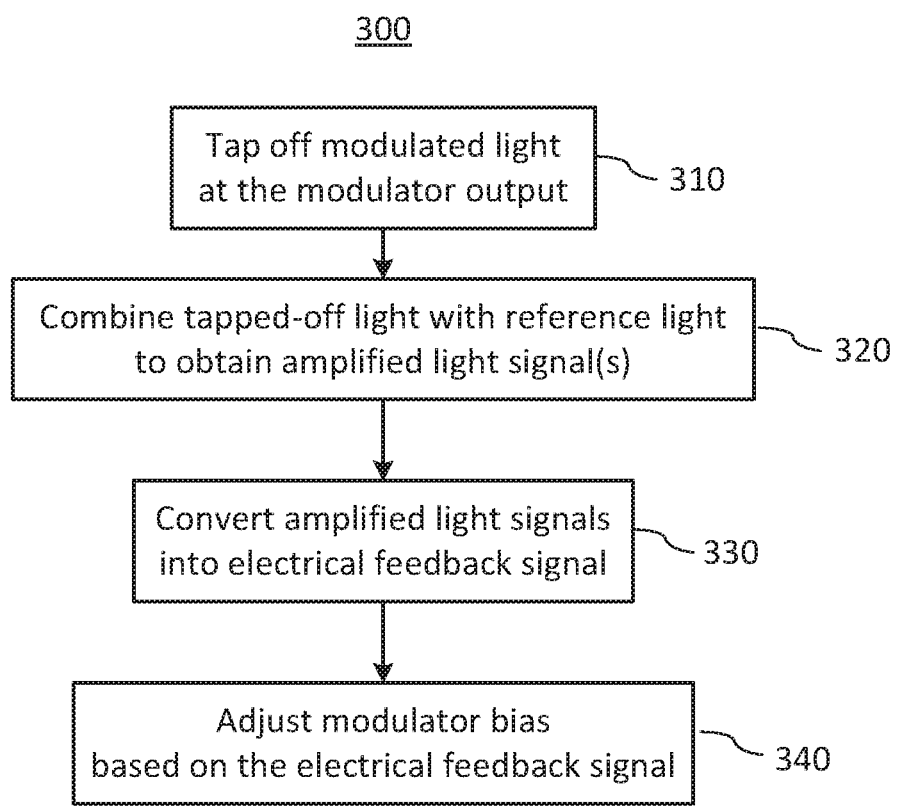
FIG. 3 is a general flowchart of a method for an automatic control of the modulator bias.

With reference to FIG. 3, the optical modulator system of FIG. 1 may implement method 300 of automatically controlling a set point or bias of the OMC 110. The method 300 includes the following two general steps or operations: a) at step 320 mixing tapped off modulated light, such as the tapped light 123, with reference light of a greater power, such as the reference light 103, to obtain one or more mixed light signals wherein the tapped off modulated light is combined with the reference light, and b) at step 330 using a PD circuit comprising one or more PDs to convert the one or more mixed light signals into one or more electrical feedback signals carrying information about the modulator bias. In one embodiment the method may include tapping off a portion of the modulated light at the modulator output at step 310, and may further include step 340 of adjusting the modulator bias based on the one or more electrical feedback signals.

Figure 4A:
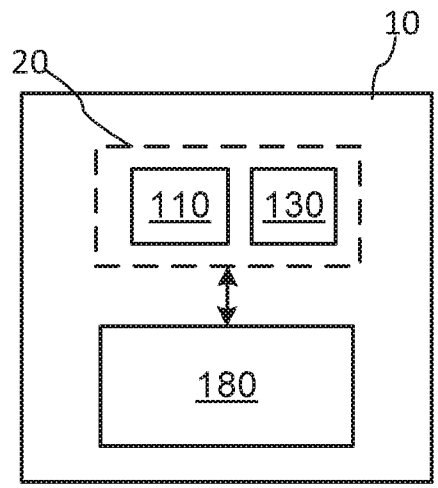
FIG. 4A is a schematic diagram illustrating an example packaging arrangement of the modulator system of FIG. 1.
Figure 4B:
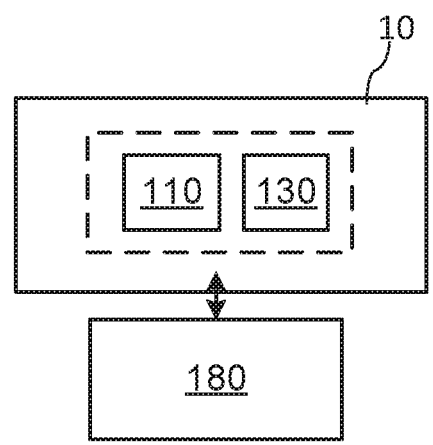
FIG. 4B is a schematic diagram illustrating another example packaging arrangement of the modulator system of FIG. 1.

With reference to FIGS. 4A and 4B, the OMR 130 is preferably disposed adjacent to OMC 110, so as to reduce the optical loss therebetween. Both the OMC 110 and OMR 130 may be enclosed within, or mounted upon, a same housing 10. In one embodiment, the housing 10 may also enclose the EFC 180. In one embodiment the OMR 130 may be formed at least in part in or upon a same semiconductor substrate 20 as the OMC 110. For example, in some embodiment all of the elements of the OMC 110 and OMR 130 may be formed using the Silicon-on-Isolator (SOI) technology in a same SOI chip. In some embodiments, the OMR 130, or a portion thereof, may be formed in a different substrate (not shown) that may be for example butt-coupled to the OMC substrate or chip 20. The EFC 180 may be embodied using analog and/or digital electronics, or a combination thereof. In embodiments wherein one or both of OMC 110 and OMR 130 of the modulator device 100 is implemented in a semiconductor chip, the EFC 180 may also be implemented fully or in part in the same semiconductor chip, or may be implemented separately therefrom. In some embodiments, the EFC 180 may be embodied as a separate module that may include one or more dedicated or shared hardware processors or programmable logic circuits. The EFC 180 may be embodied using analog electrical circuitry, digital electronics, or a combination thereof. Digital electronics that may be used to implement the EFC 180 may include one or more FPGAs, one or more microprocessors, and/or one or more application specific integrated circuits (ASIC).

Turning now to FIG. 5, there is schematically illustrated a quadrature modulator (QM) 210 which represents one embodiment of the OMC 110. QM 210 may be in the form of an optical waveguide structure that converts the input signal light 101 into two modulated optical signals that are conventionally referred to as the I (in-phase) optical signal and Q (quadrature) optical signal, and which are combined together to obtain the modulated light 121 and the tapped light 123. In the illustrated embodiment the QM 210 is embodied as a Mach-Zehnder (MZ) interferometer (MZI) having an optical modulator 112 in each of its two arms that produce the I and Q optical signals, and an output optical coupler 116 for combining the I and Q optical signals produced by the optical modulators 112. The QM 210 further includes a first tunable optical phase shifter 116 that is controlled through the electrical control port 114 to adjust the optical phase of one of the I and Q signals so that they are added in the output coupler with an IQ phase shift $\phi_{IQ}$ therebetween, which defines a set point of the QM 210. The output optical coupler 116 may be for example in the form of a 2×2 multi-mode interference (MMI) coupler that mixes the I and Q optical signals received at it input ports and outputs the modulated light 121 and the tapped light 123 from its output ports 117 and 118, respectively, each of them combining the I and Q optical signals with the IQ phase shift $\phi_{IQ}$ therebetween. The output optical coupler 116 may also have alternative embodiments, for example it may be in the form of a 2×1 optical combiner followed by a 1×2 optical splitter or tap.

In order to ensure proper operation of the QM 210, the IQ phase shift $\phi_{IQ}$ imposed by the first tunable optical phase shifter 116 should be set to a desired set-point value $\phi_{IQ}^0$. In example embodiments described hereinbelow, the desired set-point value $\phi_{IQ}^0$ of the IQ phase shift $\phi_{IQ}$ is equal substantially to $\pi/2$ rad, so as to ensure that the I and Q optical signals in the QM 210 are added in quadrature at the output of the QM 210; however, the particular desired value of the optical phase shift $\phi_{IQ}^0$ may differ in other embodiments, and all such values are within the scope of the present disclosure. The value of the IQ phase shift $\phi_{IQ}$ is controlled by an electric bias signal 199, which is provided at the control port 114 and which may be adjusted in operation in response to a drift in modulator properties so as to maintain the modulator at a desired set point $\phi_{IQ}=\phi_{IQ}^0$.

In one embodiment the QM 210 may be configured as a QPSK modulator, with the optical modulators 112 in cooperation with the tunable optical shifter 116 producing two BPSK modulated I and Q optical signals, resulting in an equidistant QPSK symbol constellation at the QM outputs of when added with the IQ phase shift $\phi_{IQ}^0=\pi/2$.

Referring to FIG. 6, in one embodiment each of the optical modulators 112 may be in the form of a Mach-Zehnder modulator (MZM) 212, so as to form a nested MZM wherein two parallel MZMs 212 are nested in an MZI 232. In operation, each of the MZM 212 may be driven by an RF signal in the form of a nonreturn-to-zero (NRZ) binary voltage waveform $V_{I,Q}(t)$ that switches between $+V\pi$ and $-V\pi$, thereby producing the I and Q optical signals that are BPSK modulated. Here, $V\pi$ is the half-wave voltage, i.e. the voltage that causes the optical phase of the light propagating though the MZM to change by $\pi$ radian relative to zero voltage. The output lights 121, 123 are both QPSK modulated when the two MZMs 112 are biased at their null transmission points, corresponding to MZM bias voltages $V_{MZM1,2}=\pm V\pi, \pm 3V\pi, \pm 5V\pi, \ldots$, applied to their respective bias electrodes, and the MZI 232 is biased at the quadrature phase, i.e. $\phi_{IQ}=\pi/2$, which corresponds to an IQ bias voltage $V_{IQ}$ of $(V\pi)/2 \pm nV\pi$, $n=0, 1, \ldots$ applied to the bias electrode 148 implementing the tunable IQ phase shifter 116. It will be appreciated that the optical modulators 112 capable of optical BPSK modulation may be embodied using modulator structures other than an MZM, including but not limited to ring waveguide modulators.

It will be appreciated that the method 300 illustrated in FIG. 3 wherein a feedback signal for automatic bias control is amplified by mixing a modulator tapped-off signal with a more powerful reference signal may be employed in various modulator circuits and to control bias voltages at different locations in the modulator circuit and to control set-points of various constituent modulators. For example, it may be used to control bias voltages of the two MZMs 212 in the OMC embodiment of FIG. 4, for example using one of known MZM control algorithms based on monitoring an average output power from the QM, or by monitoring optical power tapped off at the output of the MZMs prior to the output coupler of the outer MZI.

Figure 7:
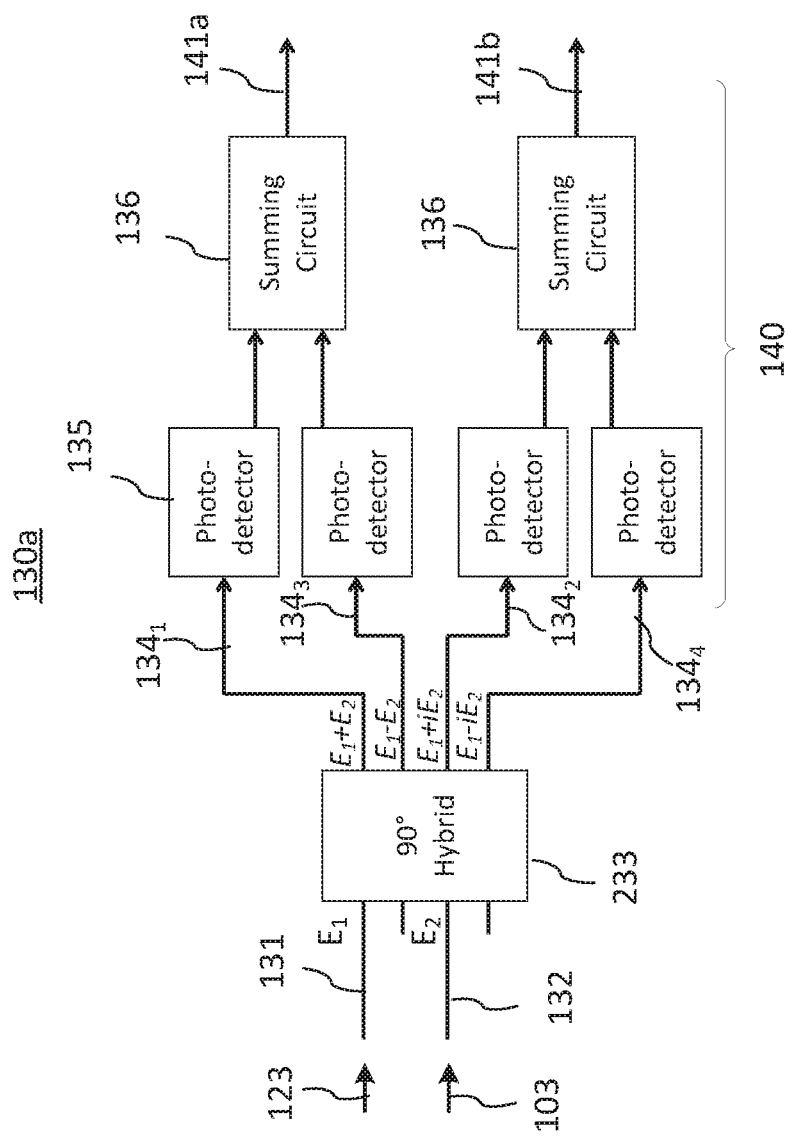
FIG. 7 is a schematic diagram of an example optical mixing receiver circuit that may be used in the bias control loop of the modulator system of FIG. 1, wherein a 90° optical hybrid is followed by two balanced photodetector (PD) circuits.

Turning now to FIG. 7, there is illustrated an embodiment of the OMR 130 that is denoted as OMR 130a. In this embodiment the OM 133 is in the form of an optical hybrid (OH) 233 with two input ports and four output ports, while the PDC 140 includes four PDs 135 that are optically coupled to the four output ports of the OH 133 and that are followed by two summing circuits 136, each of which configured to sum electrical PD signals from two of the PDs to produce two electrical feedback signals 141a and 141b. Input optical ports 131, 132 of the OH 233 are optically coupled to the OMC 110 to receiving the tapped light 123 and the reference light 103, which are combined in the OH 233 so as to output four mixed light signals $134_n$, $n=1, 2, 3$, or 4, combining the tapped and reference light 123, 103 with a progressively increasing optical phase shift $\phi_{OH}$ therebetween. In one embodiment the OH 233 is a 90° optical hybrid and outputs the optical mixed signals $134_n$, $n=1, 2, 3$, or 4, wherein the tapped and reference light 123, 103 are combined with an incremental optical phase shift therebetween $\phi_{OH}=\pi/2 \cdot (n-1)$. The summing circuits 136 may be in the form of differential amplifiers that output differential PD signals that are proportional to a difference between their inputs, i.e., $J_{diff1} \sim (J_1-J_2)$, and $J_{diff2} \sim (J_3-J_4)$, or generally to a monotonic function of the difference. Here $J_n$, $n=1, 2, 3,$ or 4, denote the electrical PD signals at the output of the PDs 135, for example photo-currents or photo-generated voltages. Assuming that the phase error of the OH 233 is small, the outputs of the PD summing circuits 136 may be written in the following form:

$$J_{diff,1}=R\sqrt{P_{ref}P_{Sig}(t)}\cos(\Delta\phi(t)) \quad (1)$$

$$J_{diff,2}=P\sqrt{P_{ref}P_{Sig}(t)}\sin(\Delta\phi(t)) \quad (2)$$

Here $P_{ref}$ is the optical power of the reference light 103, $P_{sig}=P_{sig}(t)$ is the optical power of the tapped light 123, and $\Delta\phi(t)$ is the optical phase difference between the reference and tapped light at the point of combining, R is a proportionality coefficient that accounts for the PD conversion efficiency and possible gain in the summing circuits 136, and t denotes time. The differential PD signals $J_{diff1}$ and $J_{diff2}$ at the output of the differential summing circuits 136 will also be referred to herein as the I and Q electrical signals, respectively, and denoted as $J_I$ and $J_Q$.

Figure 8:
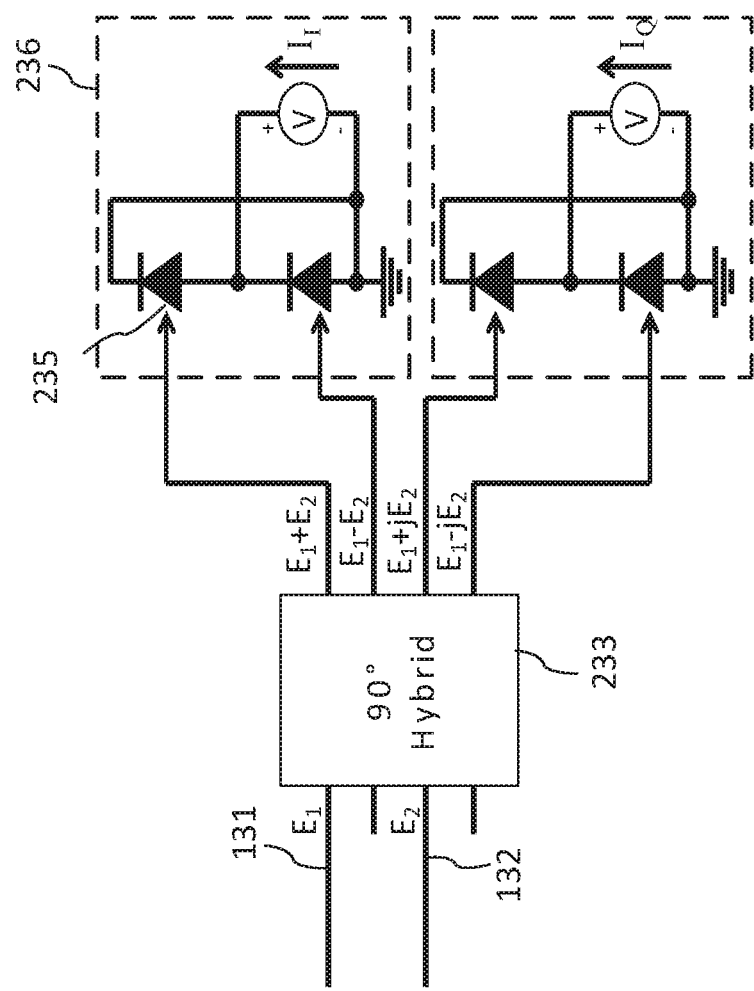
FIG. 8 is a schematic diagram of one embodiment of the optical mixing receiver circuit of FIG. 7 illustrating an example implementation of the balanced photodetector (PD) circuits.

Turning now to FIG. 8, there is illustrated an exemplary implementation of the OMR 130a of FIG. 5 wherein the PDs 135 are implements as four photodiodes 235 that are electrically connected to implement two balanced photodetectors in the form of balanced PD pairs 236, each biased by a voltage source, with the electrical currents $J_I$ and $J_Q$ supplied by the voltage sources being equal to the difference between the two photocurrents generated by the PDs in the respective balanced PD pair. The balanced PD pairs 236 provide the differential summing functionality that is represented by the summing circuits 136 in FIG. 7.

Figure 9:
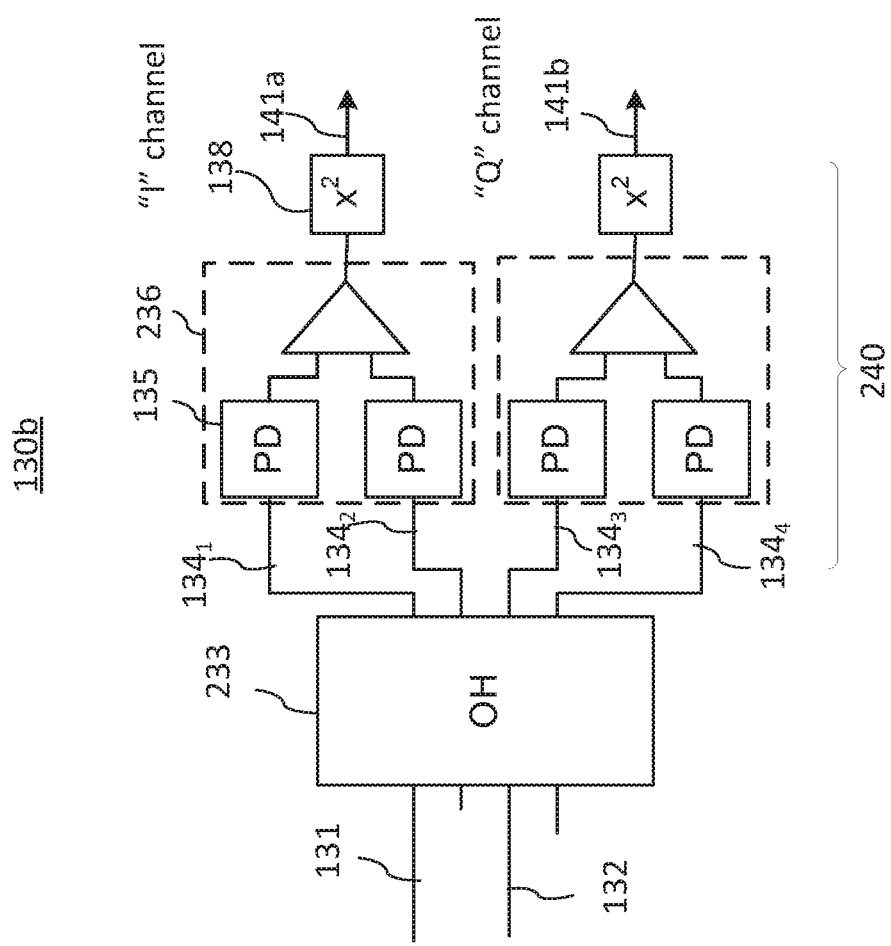
FIG. 9 is a schematic diagram of an embodiment of the optical mixing receiver circuit of FIG. 7 having two RF rectifying circuits at the output.

Turning now to FIG. 9, one embodiment of the OMR 130, which is denoted as 130b, includes two rectifying circuits 138 which connect to the outputs of two balanced PD pairs 236 and which are configured to rectify the differential PD signals $J_{diff1}$ and $J_{diff2}$ received from the output of the balanced PD pairs 236 prior to outputting them as the electrical feedback signals 141a and 141b. The balanced PD pairs 236 may be embodied for example using differential amplifiers, or as illustrated in FIG. 8, or in any other suitable way. In one embodiment, the rectifying circuits 138 are broad-band and fast enough to respond to changes in the received signal at the data rate of the modulation. In one embodiment, the rectifying circuits 138 may be configured to output signals that are proportional to squares of the differential PD signals $(J_{diff1})^2 \sim (J_1-J_2)^2$ and $(J_{diff2})^2 \sim (J_3-J_4)^2$. In one embodiment, the rectifying circuits 138 may be configured as high-speed RF power detectors that are capable of responding to changes in the input RF power at the modulation data rate.

Referring now to FIG. 10, there is illustrated an exemplary optical modulation system with an automatic modulator bias control. It includes an embodiment of the modulator device 100 in the form of a modulator device 400, and an EFC 280 embodying the EFC 180 of FIG. 1. The modulator device 400 may be embodied as a PIC that is formed fully or in part in or upon a semiconductor substrate 422, and may be referred to as the PIC modulator device 400 or simply as the PIC 400. The PIC modulator device 400 may be generally as described hereinabove with reference to FIGS. 1, 2A, 5, and 6; with the input optical splitter or tap 154, the optical phase tuner 158 in the path of the reference light 103, and QM 210 embodying OMC 110. The QMR 230 is an embodiment of the OMR 130 of FIG. 1 and may be, for example, in the form of the QMR 130b illustrated in FIG. 9, but other OMR embodiments may also be possible, with some examples described hereinbelow. The input optical tap 154, which connects at its input port to the input optical waveguide 401 of the PIC 400, has a main output port that connects to the input optical waveguide 402 of the QM 210. An optical waveguide 403 connects a tap port of the input optical tap 154 to a second optical port of the OMR 230 and incorporates the optical phase tuner 158. The QM 210 has a main output port that connects to an output optical waveguide 404 of the PIC 400, and a tap port that connects to a first optical port of the OMR 230.

In operation input light 151 received into the input optical waveguide 401 is split by the tap 154 into the reference light 103 that is directed towards the second optical port of the OMR 230, and the signal light 101 that is coupled into the QM 210 to be modulated. The QM 210 outputs modulated light 121 and tapped light 123, with the former provided through the output waveguide 404 as the main output of the PIC modulator device 400, and the tapped light 123 guided into the first input optical port of the OMR 230. OMR 230 is configured to mix light 103 tapped off before the QM 210 and light 123 tapped off at the output of the QM 210 and to produce, from the mixed light, one or more electrical feedback signals 141, such as for example two quadrature electrical feedback signals 141a and 141b as described hereinabove with reference to FIGS. 7-9.

The EFC 280 may be configured to process the feedback signal or signals 141 and to generate therefrom the bias control signal 199 for controlling the bias voltage Vb that determines the IQ phase shift $\phi_{IQ}$ in the QM 210, and a reference control signal 198 for tuning the optical phase of the reference light 103 by means of the optical phase tuner 158. Accordingly, in one embodiment the EFC 280 may include a reference control circuit (RCC) 286 and a bias control circuit (BCC) 285 that are configured to process the feedback signal or signals 141 and to generate the reference control signal 198 and the bias control signal 199, respectively. The EFC 280 may implement a variety of control algorithms to track changes in the modulator set point and to ensure that the IQ phase shift stays approximately equal to the desired set-point value, such as $\pi/2$ rad in a typical embodiment. In one embodiment, the EFC 280 may be configured to vary the optical phase of the reference light 103 by varying the reference control signal 198 to the input optical phase tuner 154 while maximizing or minimizing a first electrical feedback signal 141a, and to tune the bias control signal 199 to vary the voltage Vb that controls the IQ phase shift so as to equalize two electrical feedback signals 141a and 141b. In one embodiment, the EFC 280 may be configured to vary at least one of the optical phase of the reference light 103 and the IQ phase shift in the QM 210 so as to equalize the electrical feedback signals 141a and 141b. Other embodiments of the control algorithm will become clear from the description hereinbelow.

Principles of operation of the EFC 280 may be understood by considering an embodiment wherein the QM 210 is an optical QPSK modulator wherein optical fields $E_I(t)$ and $E_Q(t)$ are added at the output with the phase shift $\phi_{IQ}$ to produce the tapped light 123, which is then coherently mixed with the reference light 103 in the OH 233, as illustrated in FIGS. 7-9 to produce four mixed optical signals 134n with complex amplitudes $$E_1 = \frac{1}{2}(E_{sig} + E_{ref}) \quad (3a)$$

$$E_2 = \frac{1}{2}(E_{sig} - E_{ref}) \quad (3b)$$

$$E_3 = \frac{1}{2}(iE_{sig} + E_{ref}) \quad (3c)$$

$$E_4 = \frac{1}{2}(iE_{sig} - E_{ref}) \quad (3d)$$

where $i=\sqrt{-1}$, $E_{Sig}=|E_{Sig}| \exp(i\phi_{Sig})$ is the complex amplitude of the tapped light 123 in the OH 233, $E_{ref}=|E_{ref}| \exp(i\phi_{ref})$ is the complex amplitude of the reference light 123 in the OH 233. Assuming that the optical fields $E_I(t)$ and $E_Q(t)$ each have a phase that switches between 0 and $\pi$ and a same real value amplitude, i.e.

$$|E_I(t)|=|E_Q(t)|=A, \quad (4)$$

Figure 11:
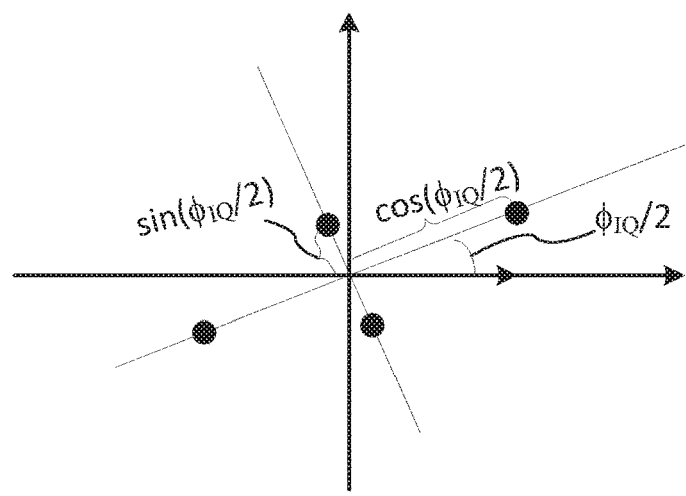
FIG. 11 is a schematic graphical representation of a distorted BPSK constellation with a non-ideal IQ phase shift.

The complex amplitude $E_{Sig}$ of the tapped light 123 may be described by a four-point constellation defined by the following two equations (2) and (3), see FIG. 11:

$$\phi_{Sig} = \left[0, \frac{\pi}{2}, \frac{3\pi}{2}, \pi\right] + \frac{\phi_{IQ}}{2}, \quad (5)$$

and $$|E_{Sig}| = A\left[\cos\left(\frac{\phi_{IQ}}{2}\right), \sin\left(\frac{\phi_{IQ}}{2}\right), \sin\left(\frac{\phi_{IQ}}{2}\right), \cos\left(\frac{\phi_{IQ}}{2}\right)\right]. \quad (6)$$

The four values within brackets [ . . . ] in the RHS of equations (5) and (6) denote four possible values of the real-valued amplitude $|E_{Sig}|$ (eq. 6) and phase $\phi_{Sig}$ (eq. 5) of the optical field $E_{Sig}(t)$ of the tapped light 123 that result from the BPSK modulation of the I and Q optical signals in the QM 210; $|E_{ref}|$ is the real-valued amplitude of the reference light 103 and $\phi_{ref}$ is the optical phase thereof in the OH 133 relative to that of the tapped light 123, $|x|$ denotes absolute value of 'x'. The constellation described by equations (4) and (5) is illustrated in FIG. 11.

The OH 233 combines the tapped light 123 with the reference light 103, and outputs the four different mixed optical signals wherein the tapped light is coherently mixed with the reference light with a phase shift $n\cdot\pi/2$, with complex amplitudes defined by equations (3a)-(3d).

The in-phase (I) and quadrature (Q) electrical signals $J_I$ and $J_Q$ at the output of the differential summers 136 are given by equations (1) and (2) with $P_{Sig}=|E_{Sig}(t)|^2$, $P_{ref}=|E_{ref}(t)|^2$, and $$\Delta\phi(t)=\phi_{Sig}(t)+\phi_{ref}, \quad (7)$$

with $\phi_{Sig}(t)$ and $|E_{Sig}(t)|$ switching between four values given by equations (5) and (6). Generally, these signals depend on the IQ phase $\phi_{IQ}$, and therefore are sensitive to its variations from the desired set-point value $\phi_{IQ}=\pi/2$. However, it can be seen that these signals cease to depend on the IQ phase $\phi_{IQ}$ after averaging over a time $T_{avrg}$ that is much greater than the duration $T_{sym}$ of one BPSK symbol, which is defined by the inverse of the modulation data rate $R_{mod}$. By way of example, $R_{mod}$ may be in the gigabit per second (Gb/s) range, for example 10-100 Gb/s.

Accordingly, the differential PD signals $J_I$ and $J_Q$ may be first rectified by the rectifying RF circuits 138 that operate at the modulation data rate $R_{mod}$ if lower-speed electronics is to be used in EFC 280 to detect and track changes in the IQ phase $\phi_{IQ}$. The OMR 230 therefore may include the rectifying RF circuits 138, for example in the form of high-speed squaring circuits, such as RF power detectors. Indeed, time-averaged power $P_I=\langle(J_I)^2\rangle$ and $P_Q=\langle(J_Q)^2\rangle$ of the differential PD signals $J_I$ and $J_Q$ may be described by the following equations (8) and (9):

$$P_I = aP_{Sig}P_{ref}[1+\cos(\phi_{IQ})\cdot\cos(\phi_{IQ}-2\phi_{ref})] \qquad (8)$$

$$P_Q = aP_{Sig}P_{ref}[1-\cos(\phi_{IQ})\cdot\cos(\phi_{IQ}-2\phi_{ref})]; \qquad (9)$$

they are sensitive to $\phi_{IQ}$ and therefore can be used as the feedback signals 141a and 141b by a lower-speed electronics in the EFC 280. Here a is a phase-independent multiplier coefficient that depends on the PD conversion efficiency and gain and/or efficiency parameters of the electrical circuitry following the PDs in the OMR 230. Equations (8) and (9) are obtained assuming that all QPSK symbols appear in the tapped signal 123 with equal frequency during the time of averaging.

From equations (8) and (9) it may be observed that the time-averaged signals $P_I$ and $P_Q$ are equal at the desired quadrature set point for the IQ phase shift in the QM 230, i.e. when $$\phi_{IQ} = \pi/2 + \pi \cdot m, \qquad (10)$$

and also when $$\phi_{IQ} = 2\phi_{ref} + \pi/2 + \pi \cdot m, \qquad (11)$$

where m is an integer. The same may also hold for alternative embodiments of the rectifying circuits 138, for example when their output signals are proportional to absolute values of their inputs rather than squares thereof. Accordingly, in one embodiment the EFC 280 may be configured to compare outputs of the rectifying circuits 138 at frequencies significantly lower than the modulation data rate, e.g. the time-averaged RF powers $P_I$ and $P_Q$ of the differential PD signals $J_I$ and $J_Q$, and adjust the bias control signal 198 so as to keep a feedback signal difference $\Delta=|P_I-P_Q|$ between them below a suitably small value.

Figure 12:
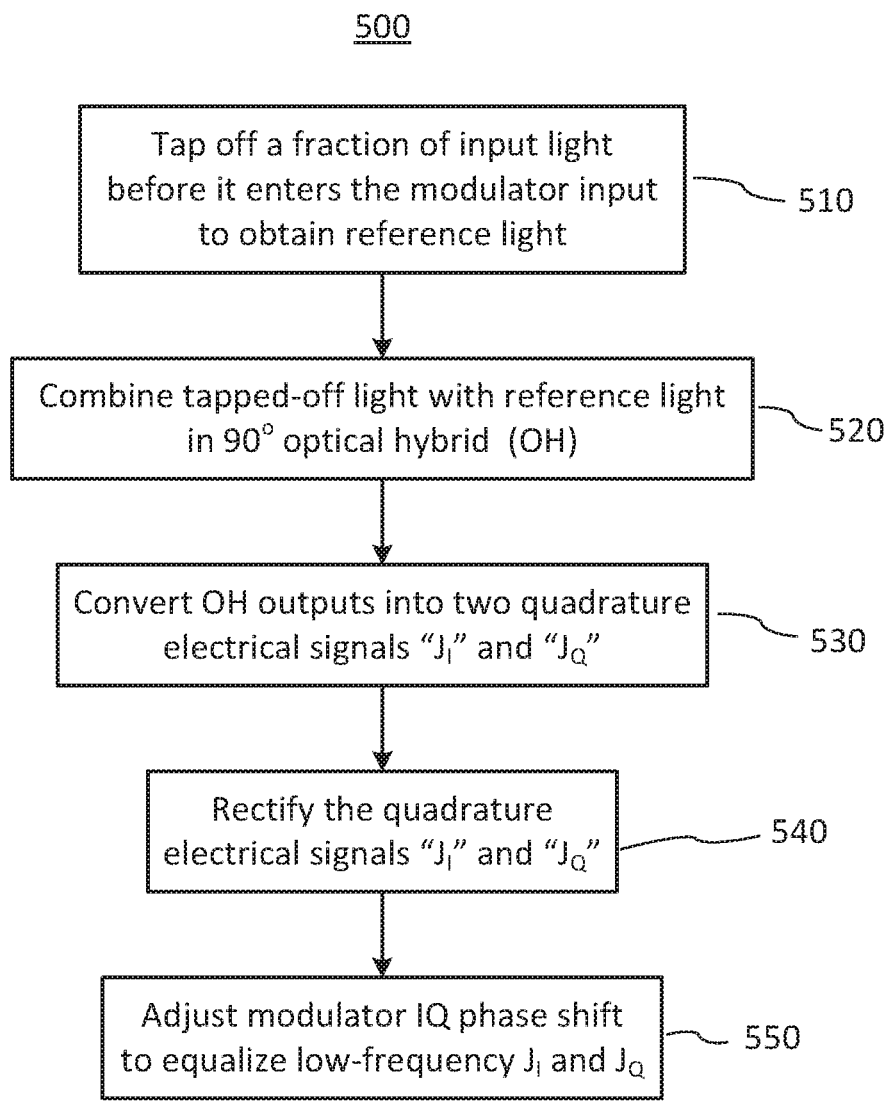
FIG. 12 is a flowchart of a method for controlling the IQ bias of the quadrature modulator system of FIG. 10.

Referring to FIG. 12, the modulator system illustrated in FIG. 10 may implement a modulator bias control method 500 that includes the following steps or operations: a) taping off a fraction of modulator input light prior to the QM 210 to obtain reference light at step 510; b) combining light from the output of the QM with the reference light using a 90° OH at step 530 to obtain four mixed optical signals; c) converting the four mixed optical signals into two quadrature electrical signals $J_I$ and $J_Q$ at step 530; d) rectifying the quadrature electrical signals $J_I$ and $J_Q$ at step 540; and, e) adjusting the IQ phase shift $\phi_{IQ}$ so as to equalize low-frequency components of the rectified quadrature electrical signals $J_I$ and $J_Q$ at step 550.

In one embodiment, the EFC 280 may further be configured to monitor the signal difference $\Delta$ while varying the reference control signal 198 to change the relative optical phase $\phi_{ref}$ of the reference light 103, so as to ensure that the signal difference does not depend on the reference control signal and hence is independent on $\phi_{ref}$. A signal difference $\Delta=|P_I-P_Q|$ that stays substantially at zero while the reference control signal applied to the input optical phase shifter varies in a sufficiently wide range indicates that the IQ bias voltage $V_{IQ}$ in the QM 210 is equal substantially to $V\pi/2$, i.e. corresponds to the desired quadrature set point $\phi_{IQ}=\pi/2+\pi \cdot m$ of the QM 210, as defined by equation (10).

Figure 13:
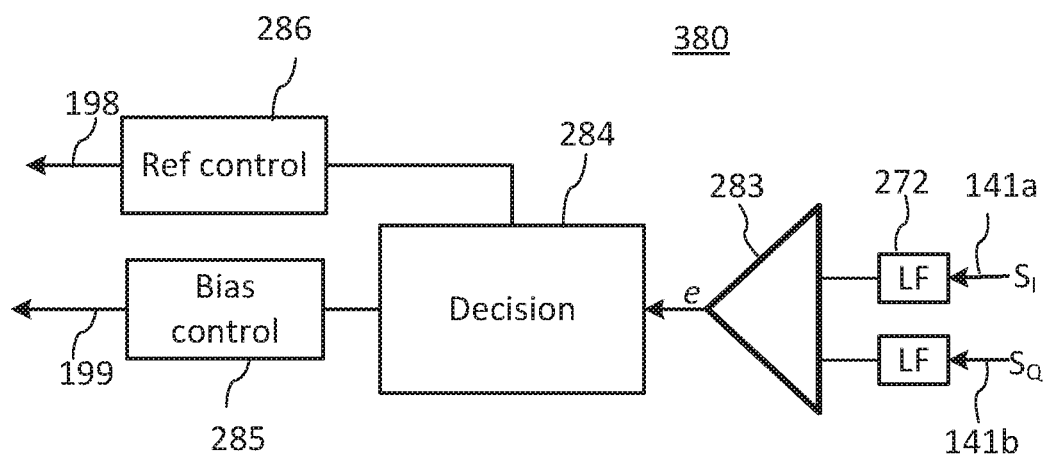
FIG. 13 is a schematic block diagram of an embodiment of an electrical feedback circuit (EFC) of the quadrature modulator system of FIG. 10 configured to equalize rectified balanced PD signals from the output of the optical mixing receiver circuit of FIG. 9.

Referring now to FIG. 13, there is illustrated a functional block diagram of an EFC 380 that may embody OFC 280 of FIG. 10. OFC 380 is configured to implement step 550 of the method 500. It includes a comparator module 283 that connects to a decision module 284, which is in turn operationally coupled to a bias control module 285, and may further be operationally coupled to a reference control module 286. The comparator module 283 has two input ports for connecting to output ports of the OMR 230 for receiving the electrical feedback signals 141a and 141b in the form of the rectified quadrature electrical signals $J_I$ and $J_Q$. The comparator 283 may be preceded by averaging circuits 272, which may be for example in the form of low-pass (LP) filters 272 that let through only low-frequency components of the feedback signals 141a,b below a filter cut-off frequency $f_{LF} \ll R_{mod}$ of the OMC 210. By way of example, $f_{LF}$ may lie for example in the MHz or, preferably, kHz range. In some embodiments the averaging or LP filters 272 may be provided at the output of the OMR 230, or by low-frequency connecting circuitry between the OMR 230 to the EFC 280. The functionality of the averaging filters 272 may also be effectively provided by low-frequency circuitry of the comparator 283.

In operation, the comparator 283 compares the averaged rectified first and second feedback signals 141a and 141b so as to evaluate a signal difference in the I and Q channels of the OMC 230, and communicates results to the decision module 284, which may signal to the bias control module 285 to adjust the IQ bias Vb in the QM 230 if the inputs to the comparator 283 is found to differ by more than a pre-defined error threshold $e_0$. For example, the comparator 283 may output an error signal e that is proportional to the difference $\Delta$ between the average RF powers $P_I$ and $P_Q$ of the differential PD signals $J_I$ and $J_Q$, e~$\Delta=(P_I-P_Q)$, and the decision module 284 may send a signal to the bias control module 285 to change the IQ bias voltage Vb for adjusting $\phi_{IQ}$ if $|e|>e_0$. If $|e|<e_0$, the decision module 284 may keep the bias voltage Vb unchanged. In one embodiment, the reference control module 198 may be operable to vary the reference optical phase $\phi_{ref}$ in a pre-defined range, such as by suitably varying the phase reference control signal 198, so as to ensure that the error signal e from the comparator 283 remains below the error threshold $e_0$ for any reference phase value $\phi_{ref}$. By way of example the reference control module may be configured to vary the reference control signal 198 so that the error signal e is determined for a plurality of values of the reference phase $\phi_{ref}$ that spans about 90°, or a fraction thereof. In one embodiment, the reference control module 286 may dither the reference phase $\phi_{ref}$ using a suitable dither signal, and the decision module 284 may be configured to detect the dither signal, or a signature thereof, in the error signal e, and to vary the IQ bias voltage Vb so as to minimize the presence of the dither signal or its signature in the error signal at the output of the comparator 283.

Furthermore from equations (8) and (9) follows that the time-averaged signals $P_I$ and $P_Q$ both cease to dependent on the reference phase $\phi_{ref}$ when equation (10) is satisfied, i.e. at the desired quadrature set point for the IQ phase shift in the QM 210. Accordingly, in one embodiment either one of the time-averaged I and Q electrical signals $P_I$ and $P_Q$ may be monitored while varying the relative optical phase of the reference light $\phi_{ref}$, and changing the bias control signal 199 to adjust the IQ phase shift $\phi_{IQ}$ if the monitored signal $P_I$ or $P_Q$ changes in dependence on the reference control signal 198 that controls the optical phase $\phi_{ref}$ of the reference light 103.

Accordingly, embodiments wherein the rectifying circuits 138 of the OMR 230 are squaring circuits, for example are configured as RF power detectors, the EFC 280 may be configured to vary the optical phase of the reference light $\phi_{ref}$ while monitoring a time average of one of the first and second electrical feedback signals from the outputs of the rectifying circuits 138, i.e. one of the average RF powers $P_I$ and $P_Q$ of the differential PD signals $J_I$ and $J_Q$. The EFC 380 may then further be configured to adjust the bias control signal 199 so as to keep either one of the average RF powers $P_I$ or $P_Q$ substantially independent on the optical phase of the reference light $\phi_{ref}$. This may include for example using the first tunable optical phase shifter 116 to adjust the IQ phase shift $\phi_{IQ}$ in the QM 210 if the first electrical feedback changes in dependence on the optical phase of the reference light.

Figure 14A:
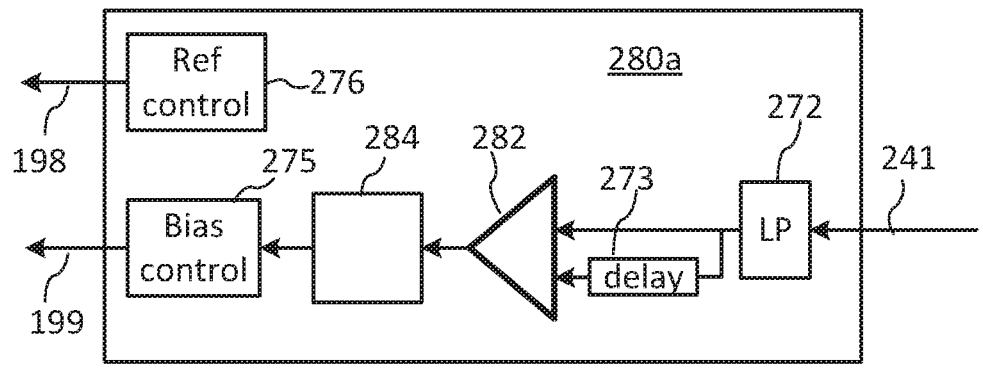
FIG. 14A is a schematic block diagram of a first example embodiment of the EFC of the quadrature modulator system of FIG. 10 configured to control the IQ bias of the quadrature modulator based on the averaged RF power of a balanced PD signal from the optical mixing receiver circuit.
Figure 14B:
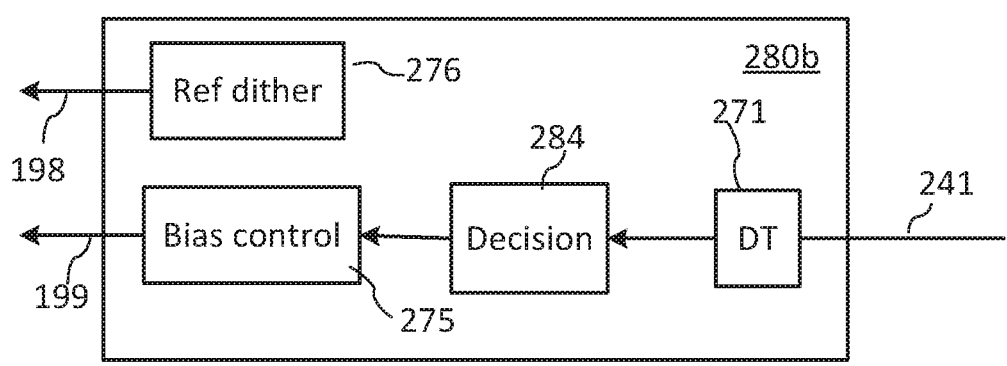
FIG. 14B is a schematic block diagrams of a second example embodiment of the EFC of the quadrature modulator system of FIG. 10 configured to control the IQ bias of the quadrature modulator based on the averaged RF power of a balanced PD signal from the optical mixing receiver circuit.
Figure 15:
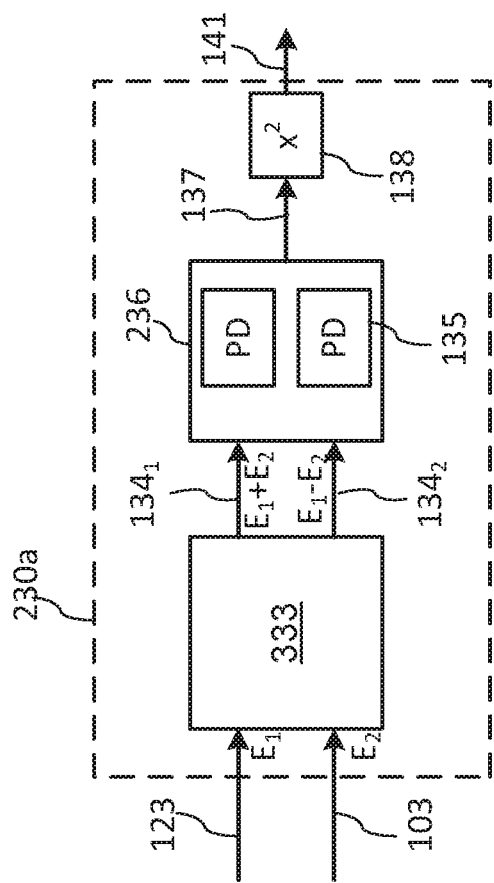
FIG. 15 is a schematic block diagram of an optical mixing receiver circuit including a 180° 2×2 optical mixer followed by a balanced PD circuit and a line-rate RF power detector.

Referring to FIGS. 14A and 14B, there illustrated functional block diagrams of two exemplary embodiment of the EFC 280, EFC 280a and EFC 280b, that are configured to control the IQ phase shift of the QM 230 so as to make a time-averaged or LP-filtered electrical feedback signal 241 insensitive to variations in the reference phase $\phi_{ref}$. The electrical feedback signal 241 may be, for example, the RF power $P_I$ 141a or $P_Q$ 141b at the output of either of the I and Q channels of the PDC 240 in FIG. 9. It may also be an electrical feedback signal 141 at the output of an OMR 230a that is based on a 180° optical mixer as illustrated in FIG. 15.

Turning first to FIG. 14A, in one embodiment the EFC 280a may be configured to operate similarly to the EFC 380 of FIG. 13, but with the input circuit thereof configured to detect changes in the LP-filtered electrical feedback signal 241. The comparator 282 compares the output signal from the LP filter 272 with a delayed version thereof, and outputs a signal that is indicative of their difference to detect low-frequency changes in the electrical feedback signal 241. The decision module is configured to adjust the IQ bias voltage Vb of the QM 230 so as to minimize the signal it receives from the comparator 282. In operation, the reference control module 276 generates the reference control signal 198 so as to vary the reference optical phase $\phi_{ref}$ in a desired range, for example over about $\pi/2$ rad, while the decision module 284 monitors for changes in the received signal 241, e.g., $P_I$ or $P_Q$, that may be caused by the changes in the reference phase, and signals to the bias control module 275 to adjust the IQ bias of the QM 210 or QM 110 so as to minimize the output signal from the comparator 282, so as to search for the IQ bias voltage Vb that makes the electrical feedback signal 241 after the LP filter 272 insensitive to the reference phase $\phi_{ref}$.

Turning now to FIG. 14B, in one embodiment the reference control signal 198 may be dithered by the reference control module 276, i.e., modulated with a desired dither waveform that is chosen to dither the reference optical phase $\phi_{ref}$ in the desired range, and the monitored signal 241, e.g. $P_I$ or $P_Q$, analyzed for the presence of the dither waveform using a dither detector 271 while varying the bias control signal 199, so as to find the bias control signal 199 corresponding to the absence of the dither waveform in the monitored signal 241. For example, the reference control module 276 may be configured to modulate the reference phase $\phi_{ref}$ at a suitably low dither frequency $f_d$, for example 1-10 kHz, and the dither detector may be embodied as a narrow-band filter centered at the dither frequency $f_d$. The decision module 284 may be configured to adjust the IQ bias voltage Vb of the QM 230 so as to minimize the signal it receives from the dither detector 271. The narrow-band filter in the dither detector 271 may be embodied for example by a digital or analog lock-in detector, as is known in the art.

In one embodiment, the bias control signal 199, for example the bias voltage Vb, may be modulated about a dc bias value <Vb> at a suitably low dither frequency $f_d$. The EFC 280 may then be configured to vary a dc component <Vb> of the bias voltage in a predefined range so as to maximize a second harmonic of the dither frequency, i.e. $2f_d$, in the monitored signal $P_I$ or $P_Q$. The second harmonic of the dither frequency, i.e. $2f_d$, in the monitored signal may be measured by filtering with a narrow-band filter 271 centered at 21d.

Referring now to FIG. 15, it will be appreciated that in some embodiments the OMR 230 may be replaced with the OMR 230a in which only one channel of the two marked in FIG. 9 as "I channel" and "Q channel" is retained. In such embodiments, the 90° OH 233 may be replaced with a 180° degree 2×2 optical mixer 333 that outputs two optical mixed signals $134_1$ and $134_2$ in which the reference light 103 is added to the tapped light 123 with an optical shift that differs between the two optical mixed signals $134_{1,2}$ by 180°, so that if the input electrical fields $E_1$ and $E_2$ are added in the first output mixed signal $134_1$, they are subtracted in the second output mixed signal $134_2$. The first and second mixed optical signals $134_{1,2}$ are then differentially detected using a balanced PD 236, generally as described hereinabove with reference to FIGS. 7-9, and the resulting differential PD signal 137 is passed to the RF squaring rectifier 138, such as for example an RF power meter that is responsive to changes in the input signal at the modulation rate $R_{mod}$ as described hereinabove. An output of the RF squaring rectifier 138 forms the electrical feedback signal 141 that is then passed to the EFC 280, for example as embodied in FIGS. 13, 14A and 14B.

Figure 16:
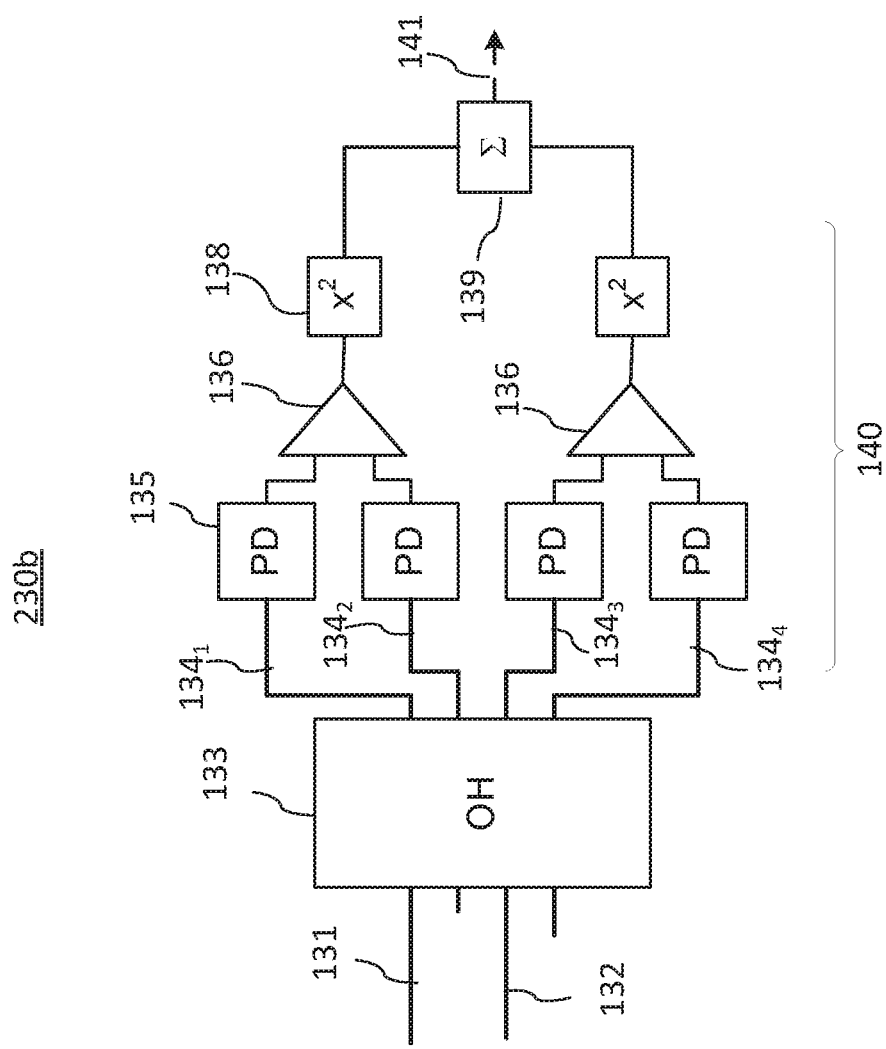
FIG. 16 is a schematic diagram of an embodiment of the optical mixing receiver circuit of FIG. 9 with a summing circuits at the output.

Referring now to FIG. 16, in one embodiment the OMR 130 of FIG. 1 may be embodied as OMR 230b that is generally as described hereinabove with reference to FIG. 9, but in which the outputs of the squaring rectifiers 138 summed, which may result in an electrical feedback signal 141 P(t) being substantially independent on either the IQ phase shift $\phi_{IQ}$ or the reference phase shift $\phi_{ref}$, but still proportional to the optical power of the reference light $P_f$, as could be seen for example from equations (1) and (2):

$$P(t)=P_I+P_Q=2RP_{Sig}P_{ref} \qquad (9)$$

Accordingly, the OMR 230b of FIG. 16 may be used to provide additional gain, $\sim P_{ref}$, to the feedback signal for controlling modulator bias in embodiments wherein the tapped and reference light 123, 103 are mutually incoherent, for example produced by two different optical emitters, or from a same optical emitter but with a relative optical delay that exceeds the coherence length of the emitter; it will be appreciated that the optical phase tuner 156 may be omitted in such embodiments. The OMR of FIG. 16 may be used to control for a modulator bias drift that results in changes of the average output optical power from the modulator, for example to control the bias of an MZM.

The OMRs 130, 230, 230a, and 230b may be embodied in fully or partially in the same PIC chip as the respective OMC 130 or 230, or they may be embodied in a different chip. The EFCs 180 and 280 may be embodied using analogue electrical circuits or they may be embodied using suitably programmed digital processors, or using programmable hardware logic as known in the art. In embodiments using analogue electronics, the comparator 283 may be embodied using a differential amplifier, and the decision module 284 may be embodied using for example a PID control circuit as known in the art. Alternatively, functionalities represented by elements of the EFC shown in FIGS. 10, 13-16 may be embodied using a digital processor.

Figure 17:
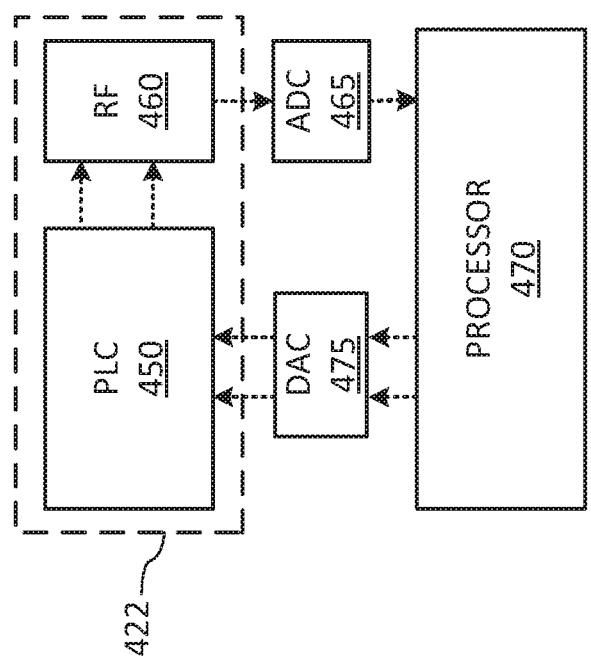
FIG. 17 is a schematic diagram of an example implementation of the waveguide modulator system of FIG. 1 or 10.

Referring now to FIG. 17, in one embodiment the modulator system of FIG. 10 may be embodied using a digital processor 470, a PIC 450 and an RF circuit 460. The PIC 450 may include at least the QM 210, and may also include the input tap 154, the reference phase tuner 158, and an optical mixer 133, 233, or 333. The RF circuit 460 may include one or more components of the PDC 140 or 240, and in some embodiments the RF rectifiers 138. In one embodiment, both the PIC 450 and the RF circuit 460 may be embodied in a same semiconductor substrate 422, for example as a single SOI chip.

Figure 18A:
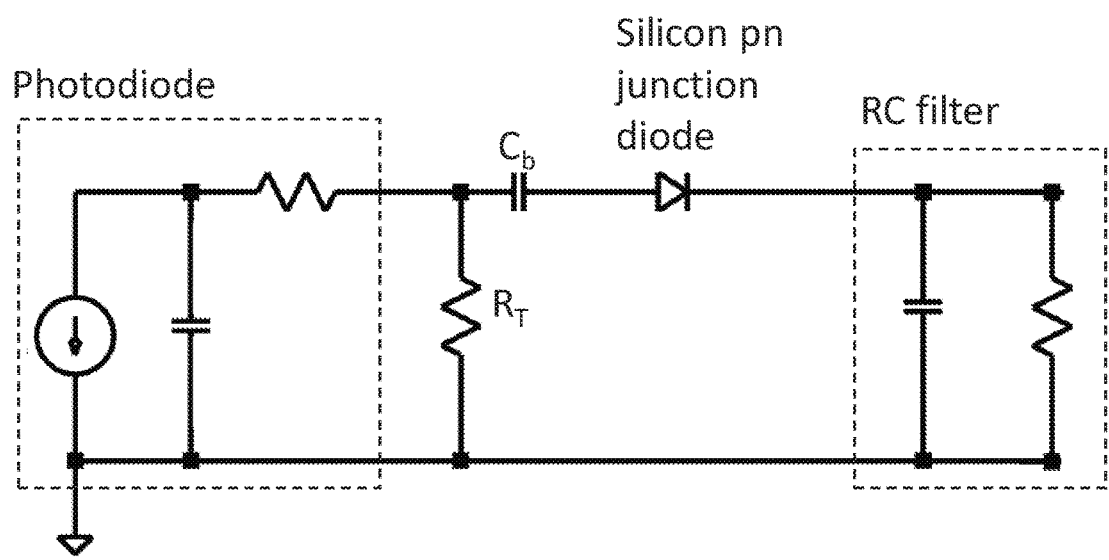
FIG. 18A is a schematic circuit diagram of one example embodiment of an RF rectifier.
Figure 18B:
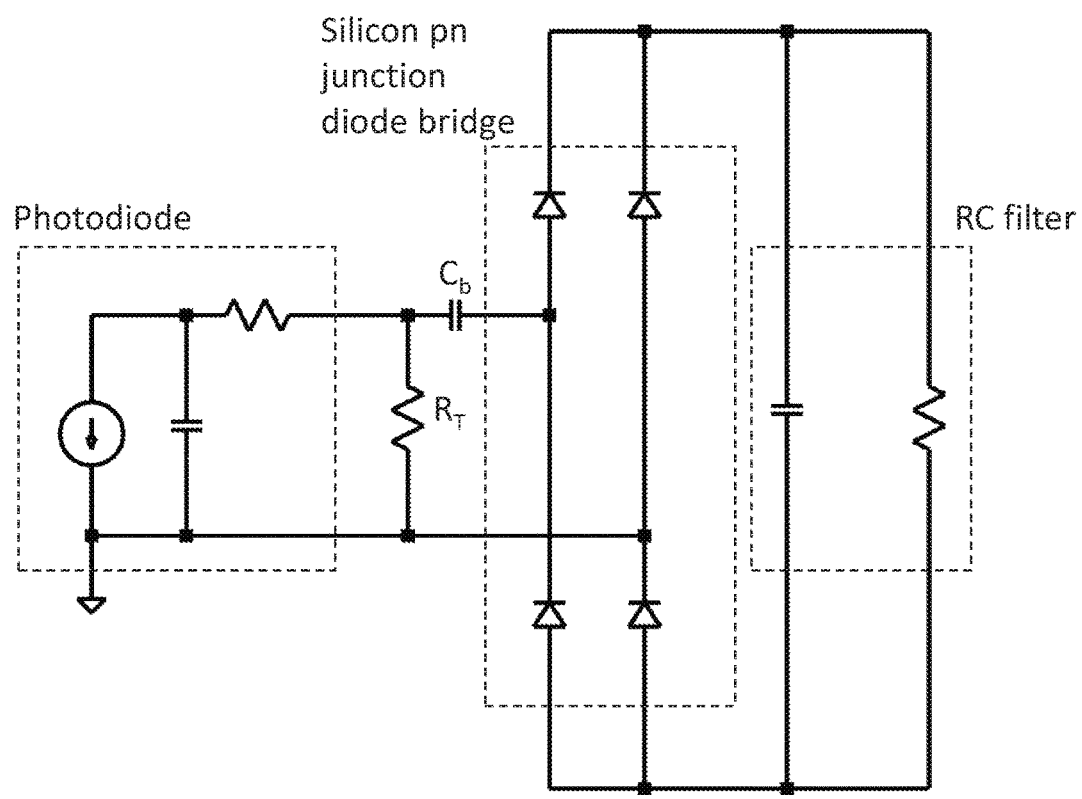
FIG. 18B is a schematic circuit diagram of another example embodiment of an RF rectifier.

The RF rectifier or rectifiers 138 may be embodied, for example, as one or more silicon or germanium pn-junction diodes, resistive, and capacitive elements. Referring to FIGS. 18A and 18B, example rectifier circuits may pass the output current from the photodiodes into a transimpedance amplifier followed by a DC-blocking capacitor. The output of the DC-blocking capacitor may then be connected to either a half-wave rectifier using a single diode (FIG. 18A), a full-wave bridge rectifier circuit (FIG. 18B), or other similar rectifying circuit whose output is proportional to the AC input amplitude. The rectifying circuit then may optionally be followed by an RC filter, or other similar filter, to improve the rectification signal integrity. The transimpedance amplification could be achieved, for example, by a resistor placed in series with the photodiode, as illustrated by the resistor $R_T$ in FIGS. 18A and 18B. All of these components are possible to realize on an SOI wafer.

Turning back to FIG. 17, the one or more electrical feedback signals from the output of the RF circuit 460 may be digitized by an ADC 465 and passed to the processor 470 which is configured, for example programmed, to perform the bias control algorithm which example embodiments are described hereinabove with reference to FIGS. 10-16.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Thus, such other embodiments and modifications are intended to fall within the scope of the present disclosure. For example, it will be appreciated that semiconductor materials other than silicon, including but not limited to compound semiconductor materials of groups commonly referred to as A3B5 and A2B4, such as GaAs, InP, and their alloys and compounds, may be used to fabricate the PIC modulator device example embodiments of which are described hereinabove. In another example, although example embodiments described hereinabove may have been described primarily with reference to an optical waveguide QPSK modulator, it will be appreciated that principles and device configurations described hereinabove with reference to specific examples may be adopted to perform an automatic bias control of optical waveguide modulators of other types, including but not limited to multilevel optical QAM modulators. Furthermore, PIC modulator devices example embodiments of which have been described hereinabove, in other embodiments it may include other optical devices, such as for example, but not exclusively, optical amplifiers.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A photonic integrated circuit (PIC) modulator device comprising:
   an optical modulator circuit (OMC) configured to modulate signal light at a target data rate to produce modulated light, the OMC comprising:
   an input port for receiving the signal light,
   an output port for transmitting the modulated light,
   a quadrature modulator circuit connected between the input port and the output port, including first and second modulators configured to produce in-phase (I) and quadrature (Q) modulated optical signals from the signal light and to combine said I and Q modulated optical signals to obtain the modulated light comprising I and Q modulated optical signals with an IQ phase shift therebetween, the quadrature modulator circuit including a bias electrode configured to vary the IQ phase shift responsive to an electrical bias signal, wherein said IQ phase shift defines a modulator set point;
   an optical tap port configured to provide tapped light indicative of the IQ phase shift, and
   an optical mixer (OM) comprising a first optical port optically connected to the optical tap port of the OMC for receiving the tapped light and a second optical port for receiving reference light, the optical mixer configured to mix the reference light with the tapped light and to produce four mixed light signals each combining the reference and tapped light with a different phase shift therebetween;
   a photodetector (PD) circuit comprising four photodetectors (PDs) and configured to convert the four mixed light signals into first and second electrical feedback signals corresponding to a power of the I and Q modulated optical signals, respectively, which are responsive to changes in the IQ phase shift; and
   an electrical feedback circuit (EFC) connecting the PD circuit to the bias electrode, and configured to generate the electrical bias signal in dependence on a relative difference between the two electrical feedback signals.

2. The PIC modulator device of claim 1, further comprising an optical splitter disposed to receive input light and configured to split the input light into the signal light and the reference light.

3. The PIC modulator device of claim 1, further comprising a housing enclosing the OMC, the OMR, and the electrical feedback circuit.

4. The PIC modulator device of claim 1, wherein the OM is configured to output the four mixed light signals comprising a first mixed optical signal combining the tapped light and the reference light with a first optical phase shift therebetween, and a second mixed optical signal combining the tapped light and the reference light with a second optical phase shift therebetween, wherein the first and second optical shifts differ generally by 180°.

5. The PIC modulator device of claim 4, wherein both the OMC and the OM are formed in or upon a same support substrate.

6. The PIC modulator device of claim 5, wherein the support substrate is a semiconductor substrate, and wherein the PD circuit is formed at least in part in or upon the semiconductor substrate.

7. The PIC modulator device of claim 4 wherein the PD circuit comprises:
a first balanced PD receiver configured to produce a first differential PD signal from the first and second mixed light signals, and
a first radio frequency (RF) rectifier disposed to receive the first differential PD signal and configured to produce the first electrical feedback signal, wherein the first RF rectifier is responsive to data-rate changes in the first differential PD signal.

8. The PIC device of claim 7 further comprising:
an optical splitter disposed to receive input light and configured to split the input light into the signal light and the reference light,
an optical phase tuner configured to tune an optical phase of the reference light in response to a reference control signal, and
wherein the electrical feedback circuit (EFC) is also configured to vary the electrical bias signal and the reference control signal in dependence on the first electrical feedback signal.

9. The PIC device of claim 8 wherein the first RF rectifier comprises an RF squaring detector configured to produce the first electrical feedback signal that is proportional to a square of the first differential PD signal, and
wherein the EFC comprises a processor comprising logic configured to monitor changes in the first feedback signal that are responsive to the reference control signal, and to adjust the electrical bias signal so as to reduce said changes.

10. The PIC device of claim 7 wherein:
the OM comprises a 90° optical hybrid configured to output the four mixed light signals comprising the first and second mixed optical signals, and further comprising third and fourth mixed optical signals,
the PD circuit further comprises a second balanced PD receiver disposed to receive the third and fourth mixed optical signals, and configured to produce a second differential PD signal therefrom, the PD circuit further comprising a second RF rectifier disposed to receive the second differential PD signal and configured to produce the second electrical feedback signal, wherein the second RF rectifier is responsive to data-rate changes in the second differential PD signal.

11. The PIC device of claim 10 wherein the EFC comprises a processor comprising logic configured to adjust the electrical bias signal so as to equalize the first and second electrical feedback signals.

12. The PIC device of claim 11 wherein the logic is configured to obtain a difference signal that is indicative of a difference between the first and second electrical feedback signals, and to monitor changes in said difference signal that are responsive to the reference control signal.

13. A method of operating an optical modulator circuit (OMC), including first and second modulators to modulate signal light so as to produce in-phase (I) and quadrature (Q) modulated optical signals and to combine said I and Q modulated optical signals, the optical IQ modulator circuit including a first tunable phase shifter configured to vary an IQ phase shift between the I and Q modulated optical signals responsive to an electrical bias signal, and a tap port for providing tapped light indicative of the IQ phase shift, the method comprising:
a) mixing the tapped light with reference light of a greater power in an optical mixer to obtain four mixed light signals, wherein the tapped light is combined with the reference light;
b) using a PD circuit comprising four PDs to convert the four mixed light signals into first and second electrical feedback signals corresponding to a power of the I and Q modulated optical signals, respectively, indicative of the IQ phase shift; and
c) varying the electrical bias signal in dependence on a difference between the first and second electrical feedback signals so as to maintain the IQ phase shift at a desired set point.

14. The method of claim 13 further comprising splitting input light into the signal light and the reference light using an optical splitter prior to modulating the signal light by the OMC.

15. The method of claim 14 wherein
step a) comprises obtaining first and second mixed light signals, wherein the tapped light is added to the reference light with a phase shift that differs generally by 180° between the first and second mixed light signals, and
step b) comprises differentially detecting the first and second mixed light signals to obtain a first differential PD signal, and rectifying the first differential PD signal using an RF rectifier that is responsive to data-rate changes in the first differential PD signal to obtain the first electrical feedback signal.

16. The method of claim 15 wherein c) comprises detecting an average of the first electrical feedback signal over a plurality of data-rate modulation periods.

17. The method of claim 16, wherein c) further comprises
c1) using a second tunable optical phase tuner to vary an optical phase of the reference light while monitoring the first electrical feedback signal, and
c2) using the first tunable optical phase shifter to adjust the IQ phase shift in the quadrature modulator if the first electrical feedback signal changes in dependence on the optical phase of the reference light.

18. The method of claim 16 wherein the optical mixer comprises a 90° optical hybrid (OH) comprising four output ports, and wherein:
step a) comprises detecting, from the four output ports of the 90° OH, four mixed light signals comprising the first and second light signals and third and fourth light signals, and
step b) further comprises obtaining a second differential PD signal in quadrature with the first differential PD signal, and rectifying the second differential PD signal to obtain the second electrical feedback signal; and
step c) comprises using the first tunable optical phase shifter to adjust the IQ phase shift in the quadrature modulator so as to equalize the first and the second electrical feedback signals.

* * * * *